US006740178B2

(12) United States Patent
Kurth et al.

(10) Patent No.: US 6,740,178 B2
(45) Date of Patent: May 25, 2004

(54) METHOD FOR PRODUCING A SINTERED HONEYCOMB BODY

(75) Inventors: Ferdi Kurth, Mechernich (DE);
Andree Bergmann, Lohmar (DE);
Helge Schlotmann, Bergisch Gladbach (DE); Günther Faust, Köln (DE);
Ludwig Wieres, Overath (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 102 days.

(21) Appl. No.: 10/097,489

(22) Filed: Mar. 14, 2002

(65) Prior Publication Data

US 2002/0152614 A1 Oct. 24, 2002

Related U.S. Application Data

(63) Continuation of application No. PCT/EP00/08592, filed on Sep. 1, 2000.

(30) Foreign Application Priority Data

Sep. 14, 1999 (DE) .......................................... 199 43 878

(51) Int. Cl.⁷ ................................................. C21D 8/00
(52) U.S. Cl. ........................................ 148/529; 148/534
(58) Field of Search ................................. 148/529, 534

(56) References Cited

U.S. PATENT DOCUMENTS

| 5,266,278 A | 11/1993 | Harada et al. | |
| 5,431,330 A | * 7/1995 | Wieres | ......................... 228/181 |
| 5,567,663 A | 10/1996 | Kotani et al. | |
| 5,648,176 A | 7/1997 | Nakagawa et al. | |
| 5,655,211 A | 8/1997 | Maus | |
| 5,657,923 A | 8/1997 | Sheller | |
| 6,199,749 B1 | * 3/2001 | Wieres et al. | ................ 228/181 |

FOREIGN PATENT DOCUMENTS

| DE | 29 24 592 A1 | 1/1981 |
| DE | 29 47 694 A1 | 9/1981 |
| DE | 37 26 075 C1 | 3/1989 |
| DE | 195 30 871 A1 | 2/1997 |
| DE | 195 39 168 A1 | 4/1997 |
| DE | 197 04 129 A1 | 8/1998 |
| EP | 0 653 264 A1 | 5/1995 |
| EP | 0 658 390 A1 | 6/1995 |
| EP | 0 736 677 A1 | 10/1996 |
| JP | 8-108077 | * 4/1996 |
| WO | WO 96/08336 | 3/1996 |

* cited by examiner

Primary Examiner—George Wyszomierski
(74) Attorney, Agent, or Firm—Laurence A. Greenberg; Werner H. Stemer; Ralph E. Locher

(57) ABSTRACT

A method for producing a metallic honeycomb configuration is described. The method includes forming a honeycomb body by stacking and/or winding layers of steel sheet containing chromium and aluminum resulting in the honeycomb body having channels through which a fluid can flow. The honeycomb body is introduced into a tubular jacket. Connections are formed between neighboring layers of steel sheet by thermal treatment. The honeycomb body is then cooled down. It is preferred for the layers of steel sheet to be provided with a rolling oil having a high carbon content before the forming of the honeycomb body, with the effect that a layer of carbon enhancing the sintering process is formed in the thermal treatment. The number of connections produced in individual regions can be further influenced by selective introduction of stresses or by stress relief.

8 Claims, 1 Drawing Sheet

METHOD FOR PRODUCING A SINTERED HONEYCOMB BODY

CROSS-REFERENCE TO RELATED APPLICATION

This application is a continuation of copending International Application No. PCT/EP00/08592, filed Sep. 1, 2000, which designated the United States.

BACKGROUND OF THE INVENTION

Field of the Invention

The subject-matter of the invention relates to a method for producing a sintered honeycomb body from thin layers of steel sheet resistant to high-temperature corrosion. Such honeycomb bodies are used in particular in exhaust systems of motor vehicles as catalyst support bodies and/or as substrates for adsorber material.

International Patent Disclosure WO 96/08336 discloses a method for producing a metallic structure, in particular a catalyst support body, from at least partly structured wound, intertwisted or laminated layers of steel sheet. In which the layers of steel sheet are subjected to a thermal treatment for forming a metallic bond of the layers of steel sheet with or without auxiliary substances.

An auxiliary substance may be a soldering powder, which is applied to the regions of the layers of steel sheet to be soldered. Published, Non-Prosecuted German Patent Application DE 29 24 592 A1 discloses various methods of applying solder.

According to International Patent Disclosure WO 96/08336, the formation of connecting regions between the layers of steel sheet may also take place without auxiliary substances. For instance, by a thermal treatment being carried out at a temperature below the melting point of the layers of steel sheet, so that the layers of steel sheet are sintered to one another.

Published, Non-Prosecuted German Patent Application DE 29 47 694 A1 also discloses that the sintering operation is simplified by the layers of steel sheet being provided with a metal coating before the sintering. The sintering technique has so far not become established in practice for the forming of honeycomb bodies, in particular for catalyst support bodies.

In applications of honeycomb bodies in exhaust systems, it is often important that they can be rapidly heated up. A reduction in the mass is particularly important for this purpose and can be achieved by the use of relatively thin layers of steel sheet. In the case of known catalyst support bodies, the sheet thickness is usually approximately 40 to 50 $\mu$m. In the case of layers of steel sheet of which the thickness is less than or equal to 35 $\mu$m, it has been established that the quality of the catalyst support bodies can be ensured only with difficulty if the layers of steel sheet are connected to one another by soldering methods. Accumulations of solder may lead to alloying at the connecting locations, which reduces the resistance to high-temperature corrosion.

SUMMARY OF THE INVENTION

It is accordingly an object of the invention to provide a method for producing a sintered honeycomb body that overcome the above-mentioned disadvantages of the prior art methods and devices of this general type.

Against this background, the invention is based on the object of specifying a method for producing a high-quality metallic honeycomb body which contains layers of steel sheet of a thickness of less than or equal to 35 $\mu$m. At the same time, the method is to be commercially advantageous. A correspondingly produced, non-soldered honeycomb body is also to be provided.

With the foregoing and other objects in view there is provided, in accordance with the invention, a method for producing a metallic honeycomb configuration. The method includes forming a honeycomb body by at least one of stacking and winding layers of steel sheet containing chromium and aluminum. A thickness of each of the layers of steel sheet being less than or equal to 35 $\mu$m and at least some of the layers of steel sheet are structured layers of steel sheet so that the honeycomb body has channels formed therein through which a fluid can flow. The honeycomb body is then introduced into a tubular jacket. Connections are formed between neighboring layers of steel sheet by a thermal treatment in which the honeycomb body is heated up to over 1100° C. The honeycomb body is then cooled down, with an average temperature transient of at least in each case 25 K/min.

The rapid heating up in comparison with conventional soldering or sintering methods is very advantageous in the first instance because the production time is reduced as a result. However, rapid heating up also has advantages with respect to the chemical processes at the surface of the layers of steel sheet, since oxidation processes impairing the connection are reduced, while the formation of, for example, carbides, in particular chromium carbides, which enhance the connections, is encouraged. Since the thin sheets have a low thermal capacity, they can also be heated up more rapidly, so that holding times at certain temperatures for evening out the temperature profile in the oven can be avoided to the greatest extent. The entire thermal bonding process can in this way be shortened to 90 minutes or less. The average temperature transient is understood as meaning the average change in temperature per unit of time during the entire heating-up operation, from the initial temperature in the oven to the highest temperature, or the corresponding change in temperature per unit of time during the cooling-down operation.

In accordance with a preferred feature of the invention, there is the step of performing the thermal treatment by annealing the layers of steel sheet of the honeycomb body.

In accordance with another feature of the invention, there is the step of heating the honeycomb body in the range of 1150° C. to 1190° C. during the thermal treatment.

It is also favorable in the case of the method according to the invention to allow the thermal treatment to proceed in a vacuum or at least a partial vacuum with a defined atmosphere, in order to avoid unwanted oxidation effects and selectively influence the surface properties of the honeycomb body.

It is preferred for the layers of steel sheet to be provided with a rolling oil of a high carbon content, in particular in the form of graphite powder, before the forming of the honeycomb body, with the effect that a layer of carbon for enhancing the sintering process is formed in the thermal treatment. When the steel sheets are produced with the desired thickness by cold rolling, a rolling oil is always used in any case, but in conventional processes for producing honeycomb bodies usually has to be removed before or during the thermal treatment. According to the invention, however, a rolling oil of a kind which during thermal treatment forms residues which essentially contain carbon is chosen, since this encourages the sintering processes. By adding graphite, for example, preferably in the form of fine powder, to the rolling oil, this effect can be further intensified. Graphite also has the advantage that it acts as a lubricant, which is of great advantage in the production of structures, in particular corrugations, on very thin sheets, as are used for honeycomb bodies according to the invention.

Furthermore, according to a preferred embodiment of the invention, the number of connections produced in individual regions can be influenced by selective introduction of stresses or by stress relief, in particular in the case of honeycomb bodies containing a multiplicity of layers of steel sheet running in an approximately spiral or involute form.

It should be pointed out that the rapidity of the heating up, the type of rolling oil and the selective introduction of stresses or stress relief are in each case advantageous on their own, but also in any desired combination, for the sintering process.

The thermal treatment is followed by a cooling-down step. This may be carried out in a vacuum or under inert gas. Any remains of carbon, which could cause problems later when coating with a catalytically active material or an adsorber material, can be eliminated during the cooling-down operation by selective feeding in of an inert-gas/oxygen atmosphere. In this case, the carbon remains burn and a defined oxide layer forms, improving the adherence of later coatings. In a preferred embodiment the honeycomb body is cooled down at an average temperature transient of 30 K/min.

The set object is also achieved by a honeycomb body, formed by stacking and/or winding layers of steel sheet containing chromium and aluminum. At least some of which are structured layers of steel sheet touching at touching locations, so that the honeycomb body has channels through which a fluid can flow. The honeycomb body is surrounded by a tubular jacket. The layers of steel sheet have a thickness less than or equal to 35 $\mu$m and at least some of the touching locations having at least one connecting region that contains carbides, in particular chromium carbides. Such a honeycomb body is mechanically very stable and resistant to high-temperature corrosion, even in the case of sheet thicknesses below 35 $\mu$m or even below 25 $\mu$m.

Other features which are considered as characteristic for the invention are set forth in the appended claims.

Although the invention is illustrated and described herein as embodied in a method for producing a sintered honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
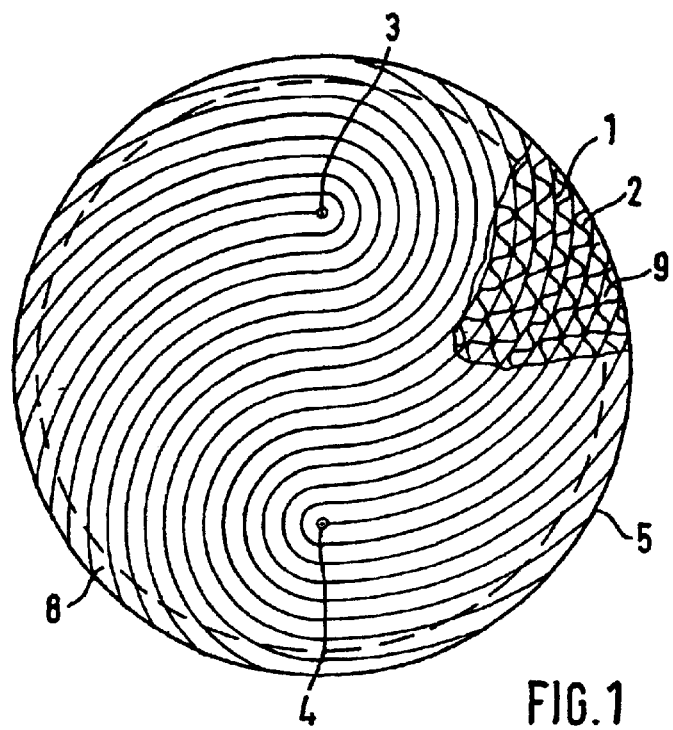
FIG. 1 is a diagrammatic, partially cut-away, end-on view of a honeycomb body according to the invention.

In all the figures of the drawing, sub-features and integral parts that correspond to one another bear the same reference symbol in each case. Referring now to the figures of the drawing in detail and first, particularly, to FIG. 1 thereof, there is shown a honeycomb body represented as an exemplary embodiment of a catalyst support body. Other embodiments and geometries of the honeycomb body are possible.

A stack of a predetermined height and a predetermined length is formed from a stack of alternating layers of smooth steel sheets 1 and corrugated steel sheets 2, which form channels 9 therein. Depending on the method of production and desired cross section to be produced, the stack need not necessarily be laminated in the form of a cuboid with planar side faces at the beginning of the production operation. Other forms, for example a parallelogram or the like, may be advantageous in production. Such a stack is then grasped by a fork, or similarly fixedly acting apparatus, at fixed points 3, 4, and twisted in opposite directions by turning the fork or bending round the ends of the stack. In this way, a form schematically represented in FIG. 1 is obtained.

The intertwisted layers of the steel sheet 1, 2 are disposed in a tubular jacket 5. The tubular jacket 5 may also contain a plurality of segments.

The honeycomb body prepared in this way may be provided with a coating which contains carbon and/or carbon compounds. The coating is applied to the layers of steel sheet 1, 2 before they are made into a support body by stacking and/or winding. In particular, the carbon may already be contained in the rolling oil used during cold rolling, in particular also in the form of graphite powder additionally contained in the oil.

The honeycomb body prepared in this way is subjected to a thermal treatment, in particular a sintering process, by which the layers of steel sheet 1, 2 are interconnected in connecting regions. During the thermal treatment, decomposition of the rolling oil and a formation of carbides, in particular chromium carbides, take place at the surface, contributing to the strength of the connections of the layers of steel sheet 1, 2 to one another. The layers of steel sheet 1, 2 are preferably approximately 15 to 25 $\mu$m thick.

Figure 2:
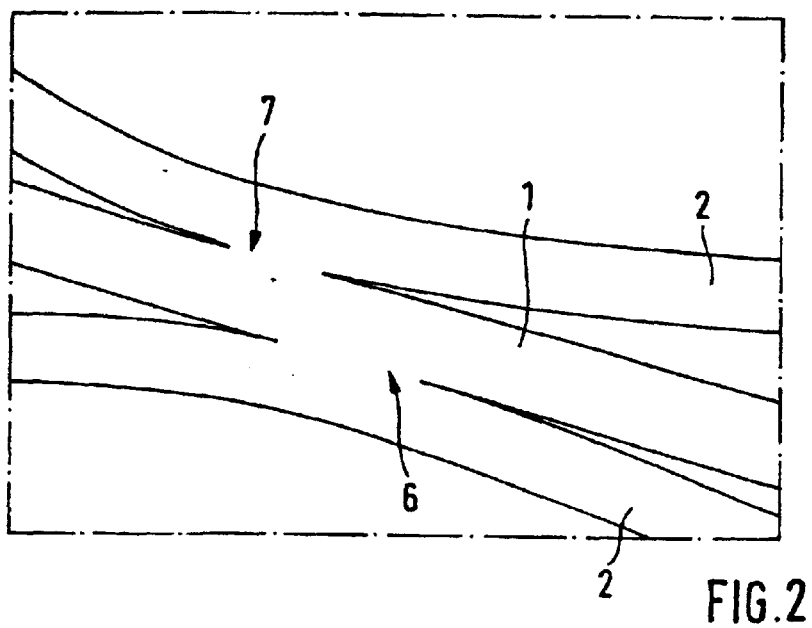
FIG. 2 is an enlarged, sectional view of interconnected layers of steel sheet.

Represented on an enlarged scale in FIG. 2 is the connecting region of neighboring layers of the steel sheet 1, 2. The connecting regions 6, 7 have been sintered together and exhibit chromium carbides. When producing the honeycomb body, the stress inside the honeycomb body, and consequently a pressing force between the layers of steel sheet 1, 2 at the touching locations, can be influenced by setting the tools. In the case of honeycomb bodies which are not spirally wound from a few layers of sheet metal 1, 2 but contain a multiplicity of individual steel sheets 1, 2, the ends of which run toward the tubular jacket 5 and are fastened there, the stress distribution over the cross section of the honeycomb body can also be influenced by selective stress relief, for example by flexing or hammering. For instance, a honeycomb body of this type produced with stress and subsequently flexed has more connections 6, 7 in an outer region 8 (see FIG. 1) than in an interior, which improves its mechanical properties. It should also be pointed out that, although according to the invention the connection of the steel sheets 1, 2 to one another takes place by sintering, the connection with respect to the tubular jacket 5 can however take place either by sintering or by soldering, depending on the requirements for the durability of these connections.

We claim:

1. A method for producing a metallic honeycomb configuration, which comprises the following steps:
    providing layers of steel sheet each having a thickness being at most equal to 35 $\mu$m and containing chromium and aluminum with a rolling oil during a cold rolling of the layers of steel sheet and, as a result of a composition and additives added to the layers of steel sheet, a carbon-rich layer forming on a surface of the layers of steel sheet if heated, at least some of the layers of steel sheet being structured layers of steel sheet;

forming a honeycomb body by at least one of stacking and winding the layers of steel sheet for forming channels in the honeycomb body through which a fluid can flow;

introducing the honeycomb body into a tubular jacket;

forming connections between neighboring layers of steel sheet by a thermal treatment in which the honeycomb body is heated up to over 1100° C.; and cooling down the honeycomb body, with an average temperature transient of at least 25 K/min.

2. The method according to claim 1, which comprises carrying out the thermal treatment in one of a partial vacuum and a vacuum.

3. The method according to claim 1, which comprises mixing in a fine powdered graphite with the rolling oil as an additive, in order to increase a carbon content.

4. The method according to claim 1, which comprises selectively stress relieving the honeycomb body, at least in subregions, by one of flexing and hammering, before performing the thermal treatment, in order to achieve a high and uniform connecting quality of touching locations in the subregions.

5. The method according to claim 4, which comprises forming the honeycomb body as a body with a multiplicity of the layers of steel sheet running outward in one of a spiral and an involute form, the body undergoing selective introduction of at least one of stresses and flexing in an outer region to give the body a stress profile in which more connections are produced in the outer region between touching locations of the layers of steel sheet than in an inner region of a cross section of the body.

6. The method according to claim 1, which comprises performing the thermal treatment by annealing the layers of steel sheet of the honeycomb body.

7. The method according to claim 1, which comprises heating the honeycomb body in the range of 1150° C. to 1190° C. during the thermal treatment.

8. The method according to claim 1, which comprises performing the cooling step at the average temperature transient of 30 K/min.

* * * * *